(12) United States Patent
Chen et al.

(10) Patent No.: US 7,712,250 B2
(45) Date of Patent: May 11, 2010

(54) METHOD FOR CULTIVATING SEAWEED HAVING ADHERENCE

(75) Inventors: Yean-Chang Chen, Taoyuan (TW);
Chia-Chieh Chen, Taoyuan (TW);
Kuan-Yin Chen, Taoyuan (TW);
Hsueh-Hsuan Liu, Taoyuan (TW); Bin Lin, Taoyuan (TW); Meng-Chou Lee, Taoyuan (TW); Ming-Chao Kuo, Taoyuan (TW); Wen-Song Hwang, Taoyuan (TW); Ying-Kai Fu, Taoyuan (TW); Wuu-Jyh Lin, Taoyuan (TW);
Lie-Hang Shen, Taoyuan (TW)

(73) Assignee: Atomic Energy Council, Taoyuan (TW)

( * ) Notice: Subject to any disclaimer, the term of this patent is extended or adjusted under 35 U.S.C. 154(b) by 847 days.

(21) Appl. No.: 11/480,440

(22) Filed: Jul. 5, 2006

(65) Prior Publication Data

US 2008/0005959 A1    Jan. 10, 2008

(51) Int. Cl.
*A01H 13/00* (2006.01)

(52) U.S. Cl. ......................................................... 47/1.4
(58) Field of Classification Search ................... 47/1.4
See application file for complete search history.

(56) References Cited

U.S. PATENT DOCUMENTS

| 2005/0120624 A1* | 6/2005 | Levy ........................... 47/59 R |
| 2008/0005959 A1* | 1/2008 | Chen et al. ..................... 47/1.4 |

FOREIGN PATENT DOCUMENTS

| JP | 2001231387 A | * | 8/2001 | |
| JP | 2002084903 A | * | 3/2002 | |
| JP | 2008161089 A | * | 7/2008 | |
| KR | 832892 B1 | * | 5/2008 | ................... 47/1.4 |

* cited by examiner

*Primary Examiner*—Francis T Palo
(74) *Attorney, Agent, or Firm*—Jackson IPG PLLC

(57) ABSTRACT

A wild seaweed, like sea lettuce, is picked and germ cells are released from the seaweed. The germ cells then obtain adherence and are sprouted into youngs of the seaweed so that the seaweed can be cultivated artificially and productively and can be supplied as a material for biomass energy.

8 Claims, 1 Drawing Sheet

METHOD FOR CULTIVATING SEAWEED HAVING ADHERENCE

FIELD OF THE INVENTION

Figure 1:
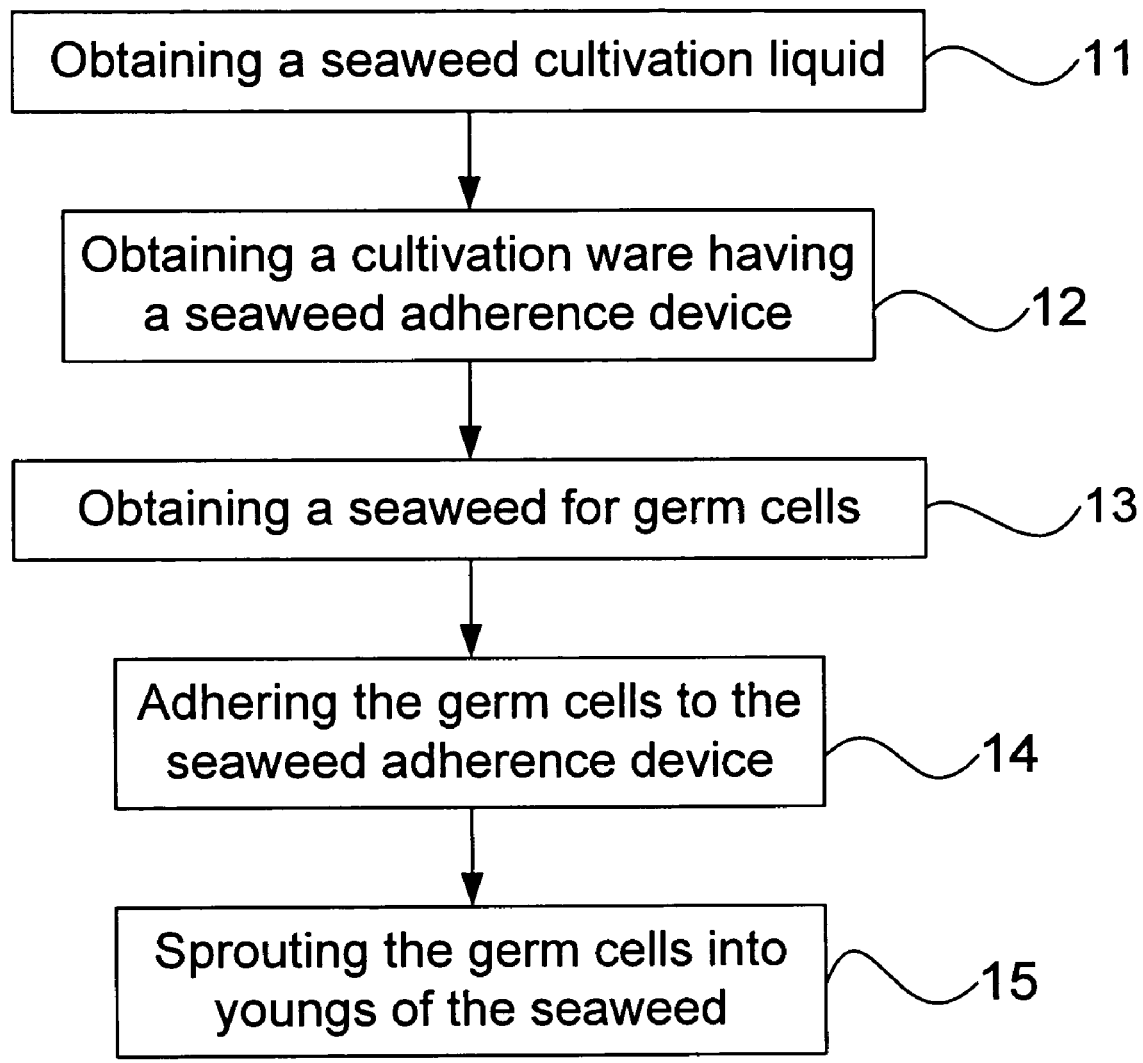

The present invention relates to a seaweed adherence; more particularly, relates to fixing floating germ cells released from a wild seaweed for an artificial culture.

DESCRIPTION OF THE RELATED ARTS

All kinds of energies are essential to our daily lives, no matter in the fields of eating, clothing, living, transporting, educating, entertaining, etc. Following the development in human's society, people are facing great challenges from the environment and the becoming shortage in energy.

Energies used today are mainly petrochemical fuels, such as coal, oil, natural gas, etc. But petrochemical fuels have a certain amount in the world and their forming is slow enough; not to mention the consumption now is so fast with a possibility of a greenhouse effect to the earth by burning these fuels. Hence, some reports show that these fuels may run out one day. According to Energy. Information Administration of Department of Energy, oil may run out in 40 years; general natural gas in 60 years; coal in 200 years; and nuclear energy of uranium in 70 years. The public is not so conscious about energy saving. Therefore, some must-do's include, in one aspect, changing people's habits on energy usages and educating people the importance of energy saving; and, in another aspect, finding alternative energies and developing renewable energies.

Concerning the expanding needs on energy, developing renewable energies is a matter so urgent that studies on solar energy, terrestrial heat, wind power, tidal energy, etc. all become hits, where biomass energy is one of the most advanced horizon. Biological resources are so abundant on earth. Under an estimation, the earth produces about 172.5 billions of biomass per year through photosynthesis. As a renewable energy, the energy these biomass contain is about 10 to 20 times of the energy the whole world consumes. Yet, we utilize only 1 to 3 percents of the energy. Hence, a best solution for energy may lies in effectively utilizing the biomass energy. Regarding the seaweed as a material for biomass energy, seaweed production has to be maintained at a certain amount to make seaweed an alternative energy to oil. But most seaweeds grow along sea shores on the rocks, so limited owing the natural environment. Hence, the prior arts do not fulfill users' requests on actual use.

SUMMARY OF THE INVENTION

The main purpose of the present invention is to cultivate seaweed artificially, where, after obtaining floating germ cells by irritating a seaweed with times of osmotic pressure, the germ cells obtain adherence to be fixed and cultured with productivity to supply material for biomass energy.

To achieve the above purpose, the present invention is a method for cultivating a seaweed having adherence, comprising steps of: obtaining a seaweed cultivation liquid; obtaining a cultivation ware having a seaweed adherence device to be sterilized followed with being loaded with the seaweed cultivation liquid; obtaining a seaweed to be put into a container having a seawater and irritating the seaweed with osmotic pressure of salinity to release germ cells; putting the germ cells into the cultivation ware having the seaweed adherence device and then deposing the cultivation ware in a plant cultivation cabinet for the germ cells to be adhered to the seaweed adherence device; and, after obtaining youngs of the seaweed by sprouting the germ cells, putting the youngs into a conical flask having the seaweed cultivation liquid. Accordingly, a novel method for cultivating a seaweed having adherence is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is a view showing the flowchart of the preferred embodiment according to the present invention.

DESCRIPTION OF THE PREFERRED EMBODIMENT

The following description of the preferred embodiment is provided to understand the features and the structures of the present invention.

Please refer to FIG. 1, which is a view showing the flow chart of the preferred embodiment according to the present invention. As shown in the figure, the present invention is a method for cultivating a seaweed having adherence, comprising the following steps:

(a) Obtaining a seaweed cultivation liquid 11: A seaweed cultivation liquid is obtained from a sterilized seawater having a salinity of 3.5% added with 1 millimeter (ml) of a saturated germanium oxide solution.

(b) Obtaining a cultivation ware (i.e., a cultivation tank) having a seaweed adherence device 12 therein: A cultivation ware having a seaweed adherence device is obtained to be processed with a moist-heat sterilization followed with pouring in an amount of the seaweed cultivation liquid between 180 ml and 220 ml. Therein, the seaweed adherence device comprises a stainless frame and a cotton string; and the cotton string winds around the stainless frame.

(c) Obtaining a seaweed for germ cells 13: A seaweed is obtained to be placed in a container having the seawater; and then the seaweed is stressed by osmotic pressure (the salinity) to release germ cells. Therein, the seaweed is changed by the osmotic pressure and then is put in a dark place for a day. And, at last, the seaweed is irradiated for 1 to 2 hours (hr) to obtain germ cells, where the germ cells are floated on a surface of the seawater.

(d) Adhering the germ cells to the seaweed adherence device 14: The germ cells are put into the cultivation ware having the seaweed adherence device; and then the cultivation ware is put into a plant cultivation cabinet for the germ cells to adhere to the seaweed adherence device. Therein, a dropper is used to suck the germ cells to be dropped into the cultivation ware; and then the cultivation ware is put into the plant cultivation cabinet. The plant cultivation cabinet is an enclosure configured to have controlled conditions to create a cultivation environment of a temperature between 20 Celsius degrees (° C.) and 30° C., a luminous intensity between 145 and 155 $\mu$ $Em^{-2}$ $s^{-1}$ and a photo period of 12/12 (light/dark) for the germ cells to be adhered to the seaweed adherence device.

(e) Sprouting the germ cells into youngs of the seaweed 15: After the germ cells are sprouted into youngs of the seaweed, the youngs are put into a centrifuge tube having 40 ml of a seaweed cultivation liquid. Therein, the germ cells are adhered to the cotton string of the seaweed adherence device until each of the germ cells obtain a length between 1 and 1.5 millimeter (mm). Then the cotton string is cut to obtain a length between 5 and 7 centimeter (cm) to be put into a conical flask having 40 ml of the seaweed cultivation liquid.

Through the above steps, after the floating germ cells are released by irritating the seaweed with times of osmotic pressures, the germ cells obtain adherence to be fixed and cultured with productivity.

Taking sea lettuce as an example, the present invention comprises the following steps:

(a) A seaweed cultivation liquid is obtained from a sterilized seawater having a salinity of 3.5% added with 1 ml of a saturated germanium oxide solution.

(b) A cultivation ware having a seaweed adherence device is obtained to be processed with a moist-heat sterilization followed with pouring in 220 ml of the seaweed cultivation liquid. Therein, the seaweed adherence device comprises a stainless frame having a size of 7 cm×7 cm, and a cotton string having a diameter of 1 mm; and, the cotton string winds around the stainless frame.

(c) A seaweed is obtained to be deposed in a container having the seawater, where the seaweed is irritated by an osmotic pressure to release germ cells. The process includes the following steps: the seaweed obtained is washed with a filtered seawater to move adherent contaminants; the seaweed is washed with a fresh water to be put to dry at a dark place; the seaweed is washed with the seawater, which is an osmotic-pressure irritation, in a way stimulating a ebb tide at a tidal flat on a rainy day; the sea lettuce is wrapped up with a wet tissue containing the seawater and is put in the dark place for 1 hr; the sea lettuce is put into the clean seawater to be placed overnight; the sea lettuce is moved to a container having the seawater; and, at last, the seaweed is irradiated for 1 to 2 hours (hr) to obtain germ cells floated on a surface of the seawater.

(d) The germ cells are put into the cultivation ware having the seaweed adherence device; and then the cultivation ware is put into a plant cultivation cabinet for the germ cells to adhere to the seaweed adherence device. Therein, a dropper is used to suck the germ cells to be dropped into the cultivation ware; and, at last, the cultivation ware is put into the plant cultivation cabinet. The plant cultivation cabinet has an cultivation environment of a temperature of 24° C., a luminous intensity of 150 µEm-2s-1 and a photoperiod of 12/12 (light/dark) for the germ cells to be adhered to the seaweed adherence device.

(e) After the germ cells are sprouted into youngs of the seaweed, the youngs are put into a centrifuge tube having 40 ml of a seaweed cultivation liquid. Therein, the germ cells are adhered to the cotton string of the seaweed adherence device until they obtain a length between 1 mm and 1.5 mm. Then the cotton string is cut to obtain a length of 6 cm to be put into a conical flask having 40 ml of the seaweed cultivation liquid.

To sum up, the present invention is a method for cultivating a seaweed having adherence, where, after obtaining floating germ cells by irritating a seaweed with times of osmotic pressures, the germ cells obtain adherence to be fixed and cultured with productivity.

The preferred embodiment(s) herein disclosed is/are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method for cultivating a seaweed having adherence, comprising steps of:
   (a) obtaining a seaweed sultivation liquid;
   (b) obtaining a cultivation ware having a seaweed adherence device, wherein said cultivation ware is loaded with said seaweed cultivation liquid after a sterilization;
   (c) obtaining a seaweed to be disposed in a container having a seawater, wherein said seaweed is stressed by employing osmotic pressure of salinity to release germ cells;
   (d) putting said germ cells into said cultivation ware, wherein said cultivation ware is then disposed in a plant cultivation cabinet for said germ cells to be adhered to said seaweed adherence device; and
   (e) after sprouting said germ cells to obtain immature seaweed plants, placing said immature seaweed plants into a conical flask having said seaweed cultivation liquid,
   wherein said sterilization in step (b) is a moist-heat sterilization.

2. The method according to claim 1, wherein said seaweed is sea lettuce.

3. The method according to claim 1, wherein said seaweed cultivation liquid is obtained from a sterilized seaweed having a salinity of 3.5% and 1 millimeter (ml) of a saturated germanium oxide solution per liter.

4. The method for according to claim 1, wherein said seaweed adherence device comprises a stainless steel frame and a cotton string; and
   wherein said cotton string winds around said stainless steel frame.

5. The method according to claim 1, wherein said germ cells in step (c) are obtained through irradiating said seaweed; and
   wherein said germ cells float on the surface of said seawater in said container.

6. The method according to claim 1, wherein said plant cultivation cabinet in step (d) has an cultivation environment of a temperature between 20 Celsius degrees (° C) and 30° C, a luminous intensity between 145 $\mu Em^{-2}s^{-1}$ and 155 $\mu Em^{-2}s^{-1}$ and a photoperiod of 12/12 (light/dark).

7. The method according to claim 5, wherein said irradiation continues for a period between 1 and 2 hours.

8. The method according to claim 1, wherein said conical flask has a volume of 50 ml; and
   wherein said conical flask has 40 ml of said seaweed cultivation liquid.

* * * * *